B. M. W. HANSON.
FACE PLATE HOLDING MEANS.
APPLICATION FILED OCT. 4, 1909.
974,057.
Patented Oct. 25, 1910.
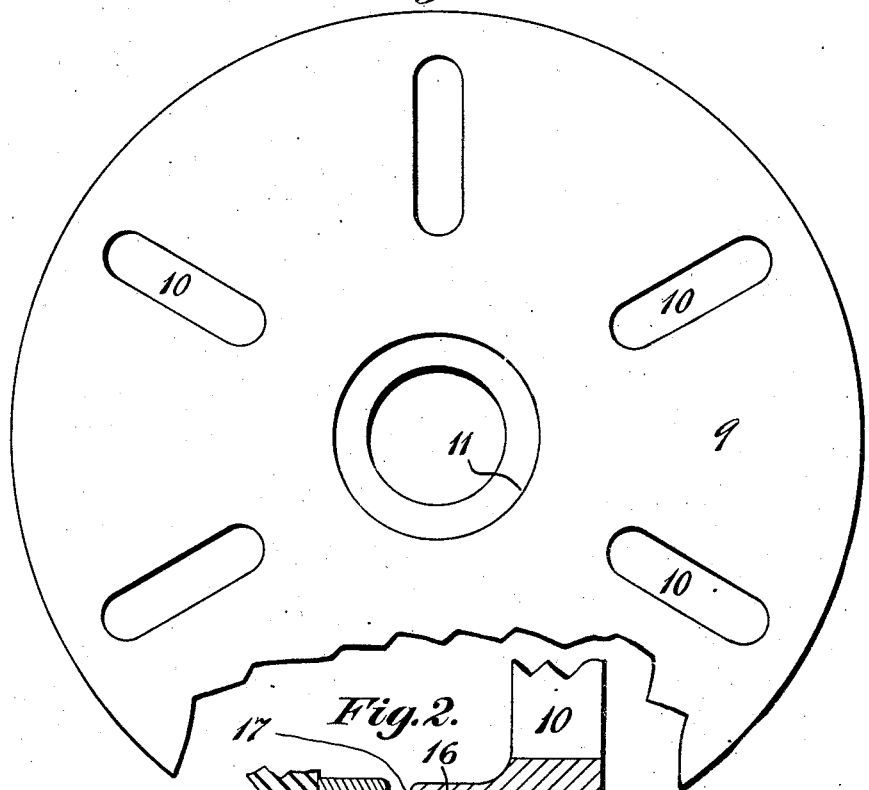
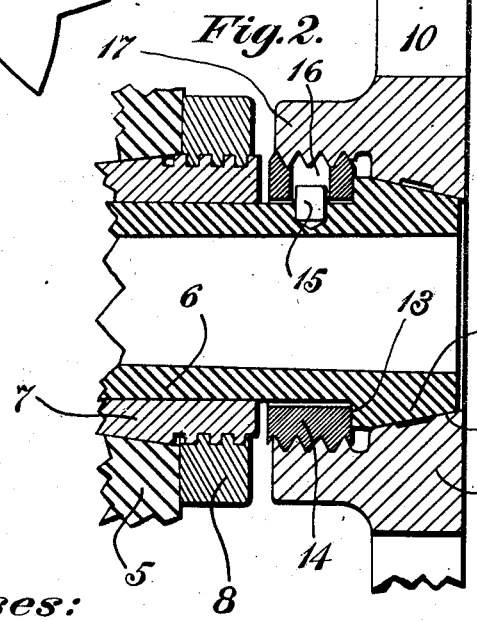
Witnesses:
Inventor:
B. M. W. Hanson
By his Attorneys,

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

FACE-PLATE-HOLDING MEANS.

974,057.          Specification of Letters Patent.      Patented Oct. 25, 1910.

Application filed October 4, 1909. Serial No. 520,778.

*To all whom it may concern:*

Be it known that I, BENGT M. W. HANSON, a citizen of the United States, residing at Hartford, in the county of Hartford and State of Connecticut, have invented certain new and useful Improvements in Face-Plate-Holding Means, of which the following is a specification.

This invention relates to face-plate holding means and the primary object of the invention is to provide simple and effective means for solidly and substantially holding a face-plate in a true position or one perpendicular to the axis of the spindle, the construction being such that I can adequately compensate for wear between said face-plate and spindle and this without chattering so that preciseness and accuracy in results are assured.

In the drawings accompanying and forming part of the present specification I represent in detail one form of embodiment of the invention which to enable those skilled in the art to practice the same will be set forth fully in the following description while the novelty of the invention will be included in the claims succeeding said description.

Referring to said drawings, Figure 1 is a front elevation of a face-plate including my invention, a portion of the same, for economy in space, being removed, and, Fig. 2 is a sectional detail view of the face-plate and said holding means, a portion of the head-stock of a lathe being also shown.

Like characters refer to like parts throughout both figures.

The invention hereinafter described may be employed with advantage in connection with various styles of lathes and in Fig. 2 of the drawings there is shown a very small portion of a head-stock of such a machine the same being denoted by 5. The spindle associated with said head-stock is denoted by 6 and except as hereinafter pointed out may follow the construction of those at present in use. Said spindle 6 is illustrated as surrounded by an externally-tapered sleeve 7 fitting a correspondingly tapered opening in the head stock 5 and which as is the custom is utilized to compensate for wear between the head stock and spindle being held in operative position by check-nuts only one of which is shown being designated by 8.

The face-plate is denoted by 9 and it has the familiar radial slots 10 serving their usual office. The said face-plate 9 has a central opening 11 the wall of which is on a back or outward taper and this tapered portion is adapted to fit upon the similarly tapered portion of the head or enlarged forward end 12 of the spindle. It is common to fit a face-plate onto the cylindrical forward end of a spindle in which event the rear face of the face-plate bears against a vertically-disposed surface or shoulder on the spindle and while initially in such a construction as this, it is possible to rigidly secure the face-plate in a vertical position, in time it is impossible to attain these functions the consequence being in operation that not only is it not possible to maintain the face-plate truly perpendicular to the axis of the spindle but it cannot be held against wabbling or vibration and the natural result is an inferior grade of work. In view of the conical or tapered seat in the face-plate and the conical or tapered bearing fitting this seat I find that in practice I can under all conditions solidly hold the face-plate absolutely at right-angles to the spindle and not only this but I can properly take-up wear between the two parts. Then also I provide an ample bearing for the face-plate. From what has been stated it will be clear that it is necessary to move said face-plate to take up wear therein and while various devices may be provided for this purpose I prefer to provide screw-thread means for the purpose and the same may be operatively associated with the face-plate in different ways the preferable one of which I will now set forth.

The presence of the enlarged tapered head 12 produces a shoulder or vertical surface 13 and I have shown as disposed between this shoulder and the forward end of the sleeve 7, an externally threaded collar 14 which surrounds the said spindle. In the present case this collar is non-rotative with respect to the spindle or is rotatively connected with said spindle and for this purpose a pin as 15 may be provided said pin being driven into a socket in said spindle and freely fitting a hole or perforation 16 in the collar. It will be obvious that if this collar have a screwthreaded connection with the face-plate 9 the latter will be drawn firmly home when it is turned in the proper direction. There is shown on the rear or back side of the face-plate 9, a hub 17 which is interiorly threaded to correspond with and to receive the externally-threaded portion of the collar 14.

It will be observed that said collar 14 loosely fits the spindle 6 immediately back of the tapered nose or head 12 thereof and there are several advantages following this feature as will now appear. In the first place I find that no great accuracy is required in forming the threads on said collar their only function being to draw the face-plate backward to seat the same solidly on said tapered nose or head or to take up wear therein. Then also the collar when utilized for the office stated does not bear against the circumferential portion of the spindle so that when an adjustment has been secured there is no reaction between such circumferential portion and the collar. Ease of assemblage also accompanies the described construction.

I desire to state at this point that I use the title "face-plate holding means" as applied to my invention simply for convenience. It will be clear that the rotary spindle hereinbefore described may carry any type of work-holder, such for instance as a chuck instead of a face-plate. I therefore provide means for compensating for wear between a work-holding device and its spindle and for always holding said work-holding device true or perpendicular to the axis of the said spindle; that is to say said work-holding device is always concentric with the spindle throughout the different adjustments of the former which adjustments are necessary in the present case to compensate for the wear to which I have referred.

I do not restrict myself to the construction hereinbefore described as I may make many changes within the scope of my invention as expressed in my claims.

What I claim is:

1. The combination of a spindle having a tapered portion, a work holding device having a tapered opening to adjustably receive said tapered portion, and means located at the rear of the front face of said work holding device for drawing the latter onto said tapered portion.

2. The combination of a spindle having a tapered portion, a work holding device having a tapered opening to adjustably receive said tapered portion, and threaded means located at the rear of the front face of said work holding device for drawing the latter onto said tapered portion.

3. The combination of a spindle having a tapered portion, a work-holding device having a tapered opening to adjustably receive said tapered portion, and a collar loosely fitted on the spindle, non-rotative therewith and also immovable in the direction of the axis of the spindle, said collar having a threaded connection with said work-holding device and being adapted on the turning of said work-holding device to draw the latter onto said spindle.

In testimony whereof I affix my signature in presence of two witnesses.

BENGT M. W. HANSON.

Witnesses:
HEATH SUTHERLAND,
W. M. STORRS.